(12) United States Patent
Sweetland, III

(10) Patent No.: US 10,933,603 B2
(45) Date of Patent: Mar. 2, 2021

(54) DEVICE FOR FORMING BIO-LOGS AND METHOD THEREFOR

(71) Applicant: Ernest J. Sweetland, III, Las Vegas, NV (US)

(72) Inventor: Ernest J. Sweetland, III, Las Vegas, NV (US)

( * ) Notice: Subject to any disclaimer, the term of this patent is extended or adjusted under 35 U.S.C. 154(b) by 0 days.

(21) Appl. No.: 16/439,464

(22) Filed: Jun. 12, 2019

(65) Prior Publication Data

US 2020/0391467 A1   Dec. 17, 2020

(51) Int. Cl.
| | | |
|---|---|---|
| B30B 11/02 | (2006.01) | |
| C10L 5/44 | (2006.01) | |
| C10L 5/36 | (2006.01) | |
| B30B 15/30 | (2006.01) | |
| B30B 1/16 | (2006.01) | |
| B30B 15/34 | (2006.01) | |

(52) U.S. Cl.
CPC .............. B30B 11/025 (2013.01); B30B 1/16 (2013.01); B30B 15/302 (2013.01); B30B 15/34 (2013.01); C10L 5/365 (2013.01); C10L 5/44 (2013.01)

(58) Field of Classification Search
CPC combination set(s) only.
See application file for complete search history.

(56) References Cited

U.S. PATENT DOCUMENTS

| | | |
|---|---|---|
| 2008/0057282 A1 | 3/2008 | Bishop et al. |
| 2008/0098646 A1 | 5/2008 | Verner et al. |
| 2009/0056205 A1 | 3/2009 | Gauthier et al. |
| 2009/0188160 A1 | 7/2009 | Wade et al. |
| 2010/0005980 A1* | 1/2010 | Ashby ..................... C10L 5/365 100/215 |
| 2010/0040721 A1 | 2/2010 | Komarek |

(Continued)

FOREIGN PATENT DOCUMENTS

| | | |
|---|---|---|
| CN | 203600646 | 5/2014 |
| CN | 106427024 | 2/2017 |

(Continued)

OTHER PUBLICATIONS

The LEAFPAC https://www.youtube.com/watch?v=pBhMIOXu_N8 Mar. 9, 2011.

(Continued)

*Primary Examiner* — Ellen M McAvoy
*Assistant Examiner* — Chantel L Graham
(74) *Attorney, Agent, or Firm* — Weiss & Moy, P.C.; Jeffrey D. Moy

(57) ABSTRACT

A portable biomass compactor has a frame. A mold is coupled to the frame. The mold is formed of a tubular member having a first open end and a second open end. The first open end is formed on a side opposite of the second open end and aligned with the second open end. A loading opening is formed on a top surface of the mold, wherein biomass is loaded into the mold through the loading opening. A compression mechanism is coupled to the frame. The compression mechanism has a moving mechanism. A rod having a proximate end is coupled to the moving mechanism. A rammer is coupled to a distal end of the rod. The rod and rammer are aligned with the first open end acid the second open end. The moving mechanism moves the rod and the rammer within the mold compressing the biomass in the mold.

23 Claims, 8 Drawing Sheets

(56) References Cited

U.S. PATENT DOCUMENTS

| | | |
|---|---|---|
| 2012/0233913 A1 | 9/2012 | von Haas |
| 2013/0319261 A1 | 12/2013 | Kelly et al. |
| 2015/0217527 A1 | 8/2015 | Kalverkamp et al. |
| 2017/0282476 A1* | 10/2017 | Shaffer .................. C10L 5/361 |

FOREIGN PATENT DOCUMENTS

| | | |
|---|---|---|
| CN | 206287557 | 6/2017 |
| FR | 2636882 | 3/1990 |
| WO | 2013019168 | 2/2013 |

OTHER PUBLICATIONS

Leaf Log Maker https://www.youtube.com/watch?v=hFSVtJbpHF8 Jan. 3, 2008.
British Inventors Green Idea of Using Leaves to Make Fire Logs https://www.dailymail.co.uk/sciencetech/article-1226943/British-inventors-green-idea-using-leaves-make-logs.html November 11, 2009.

* cited by examiner

DEVICE FOR FORMING BIO-LOGS AND METHOD THEREFOR

TECHNICAL FIELD

The present invention generally relates generally to a compacting device and, more particularly to, a device and method for forming biomass logs suitable for burning.

BACKGROUND

Biomass may be defined as organic materials that may be used as fuel. Biomass may include, but is not limited to: yard wastes such as tree and bush trimmings, mowed lawn grass, fallen leaves, twigs, branches and the like; timber processing wastes such as sawdust, tree barks, and mulches: agricultural wastes/byproducts such as cornstalks, corn cobs, and switch grass; and the combustible part of municipal solid wastes such as waste papers, cardboard, waste wood as from discarded pallets, and discarded textile products and the like.

Most biomass materials, such as waste papers, forestry waste, agricultural waste and yard bio-waste, are very bulky (loose and fluffy) when first collected. They are costly to handle, store and transport, and cannot be burned efficiently in burners, boilers or furnaces. However, compacting biomass materials increases the bulk density of the biomass materials resulting in a densified biomass log that may be efficient to transport, handle, store and combust as fuel. Compaction of these materials creates an immediate successful recycling of materials normally destined for the landfill.

Presently, there are devices which may be used to shred biomass materials such as yard waste. However, these devices do not compact the biomass materials. Instead, the shredded biomass is used as mulch and not used for burning.

There are some compaction devices that are known to exist. However, many compaction devices are expensive and complicated devices which are generally used only for industrial purposes and are not portable or for personal use. With regards to residential compaction devices, the only devices that are available are generally only used to crush or compact metals, such as aluminum cans or plastic bottles. While these and other compaction devices do reduce the volume of unwanted or used waste, they do not transform the unwanted common yard waste into a useable heat source form.

Therefore, it would be desirable to provide a device and method that overcome the above problems. The device and method would allow compacting biomass materials that can increase the bulk density of the biomass materials resulting in a densified biomass logs that may be efficient to transport, handle, store and combust. The device and method would provide a simple, less expensive and highly efficient way to compact the biomass materials. The device and method would create a tightly compressed biomass log which is able to burn hot and long in a wood stove, fireplace or other heat box.

SUMMARY

In accordance with one embodiment, a portable biomass compactor is disclosed. The portable biomass compactor has a frame. A mold is coupled to the frame. The mold is a tubular member having a first open end and a second open end. The first open end is formed on a side opposite of the second open end and aligned with the second open end. A loading opening is formed on a top surface of the mold, wherein biomass is loaded into the mold through the loading opening. A compression mechanism is coupled to the frame. The compression mechanism has a moving mechanism. A rod has a proximate end coupled to the moving mechanism. A rammer is coupled to a distal end of the rod. The rod and rammer are aligned with the first open end and the second open end, the moving mechanism moving the rod and the rammer within the mold compressing the biomass in the mold. A gate is movably coupled to the frame, wherein the gate closes the second open end during compressing of the biomass and opens the second open end to eject a biomass log formed. A gate lifter is coupled to the gate raising and lowering the gate.

In accordance with one embodiment, a portable biomass compactor is disclosed. The portable biomass compactor has a frame. A mold is coupled to the frame. The mold is a tubular member having a first open end and a second open end. The first open end is formed on a side opposite of the second open end and aligned with the second open end. A loading opening is formed on a top surface of the mold, wherein biomass is, loaded into the mold through the loading opening. A compression mechanism is coupled to the frame. The compression mechanism has a hydraulic moving mechanism. A rod has a proximate end coupled to the hydraulic moving mechanism. A rammer is, coupled to a distal end of the rod. The rod and rammer are aligned with, the first open end and the second open end, the hydraulic moving mechanism moving the rod and the rammer within the mold compressing the biomass in the mold. A gate is movably coupled to the frame, wherein the gate closes the second open end during compressing of the biomass and opens the second open end to eject a biomass log formed. A hydraulic gate lifter is coupled to the gate raising and lowering the gate. A heat jacket is formed around the mold applying heat to the mold.

In accordance with one embodiment, a portable biomass compactor is disclosed. The portable biomass compactor has a frame. An axle assembly is coupled to the frame. A mold is coupled to the frame. The mold is a tubular member having a first open end and a second open end, the first open end formed on a side opposite of the second open end and aligned with the second open end. A loading opening is formed on a top surface of the mold, wherein biomass is loaded into the mold through the loading opening. A compression mechanism is, coupled to the frame. The compression mechanism has a hydraulic moving mechanism. A rod has a proximate end coupled to the hydraulic moving mechanism. A rammer is coupled to a distal end of the rod. The rod and rammer are aligned with the first open end and the second open end, the moving mechanism moving the rod and the rammer within the mold compressing the biomass in the mold. A gate frame is coupled to the frame. A channel is formed in the gate frame. A plate is positioned in the channel, the plate closes the second open end during compressing of the biomass and opens the second open end to eject a biomass log formed. A hydraulic gate lifter raises and lowers the plate within the channel, the channel preventing the plate from moving horizontally within the channel. A hopper is coupled to the loading opening. A heat jacket is formed around the mold applying heat to the mold.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

Figure 1:
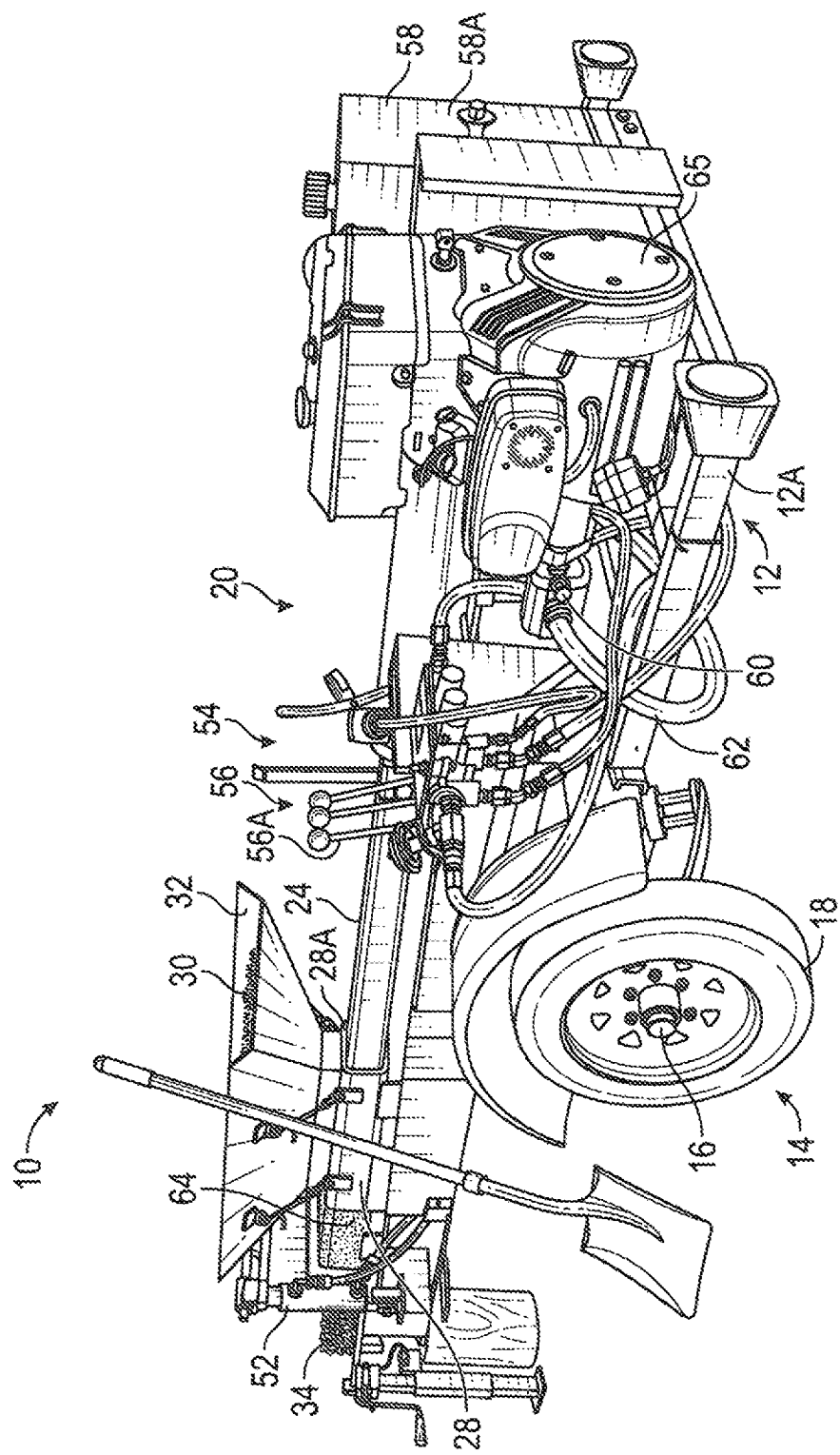
FIG. 1 is a rear perspective view showing an exemplary embodiment of a biomass compacting device in accordance with one aspect of the present application.

The description set forth below in connection with the appended drawings is intended as a description of presently preferred embodiments of the disclosure and is not intended to represent the only forms in which the present disclosure may be constructed and/or utilized. The description sets forth the functions and the sequence of steps for constructing and operating the disclosure in connection with the illustrated embodiments. It is to be understood, however, that the same or equivalent functions and sequences may be accomplished by different embodiments that are also intended to be encompassed within the spirit and scope of this disclosure.

Embodiments of the exemplary biomass compacting device and method of forming the same disclose a biomass compacting device which is able to form and disperse multiple biomass logs in a minute or less. The biomass compacting device is able to increase density of the biomass logs to allow the biomass logs to burn longer than biomass logs presently available. The biomass compacting device has an attachment which allows one to split the biomass logs when the biomass logs are being ejected from the biomass compacting device. Other features of the biomass compacting device may becomes apparent from the description below.

Referring to FIGS. 1-4, a biomass compacting device 10 (hereinafter device 10) may be described. The device 10 may have a frame 12. The frame 12 may be used to support and hold different components of the device 10. The frame 12 may be comprised of one or more beam members 12A. In accordance with one embodiment, the frame 12 may have one or more main beam members and a plurality of cross members. The one or more beam members 12A may be formed of a sturdy material resistant to bending due to weight and pressure/torque applied. In accordance with one embodiment, a metal such as steel, steel alloy or the like may be used.

An axle assembly 14 may be coupled to the frame 12. The axle assembly 14 may be used to transport the device 10 to different locations. The axle assembly 14 may have an axle rod 16. The axle rod 16 may be coupled to the frame 12. A pair of wheels 18 may be rotatably coupled to the axle rod 16. In general, the pair of wheels 18 may rotate when the device 10 is moved to a different place/location.

The device 10 may have a compression mechanism 20 coupled to the frame 12. The compression mechanism 20 may be used u compress biomass 30 in a mold 28 to form a biomass log 34. The biomass log 34 formed may have increased density when compared to prior art biomass logs and may stay together longer during the burning process due to the way the biomass 30 is fused together during the compression process.

In accordance with one embodiment, the compression mechanism 20 may have a compression rod 22. Attached to a first end of the compression rod 22 may be rammer 24. A moving mechanism 26 may be coupled to a second end of the compression rod 22. The moving mechanism 26 may move the compression rod 22 in a forward manner so that the rammer 24 compresses the biomass 30 in the mold 28 and eject the biomass log 34 once the biomass log 34 is formed in the mold 28. The moving mechanism 26 may then move the compression rod 22 in a backward manner so that new biomass 30 may be placed in the mold 28.

The moving mechanism 26 may be any type of device for moving the compression rod 22. For example, the moving mechanism 26 may be a motor, a pneumatic device, hydraulic device or the like. In accordance with one embodiment, the moving mechanism 26 may be a hydraulic unit 26A having the rammer 24 coupled to the compression rod 22 of the hydraulic unit 26A.

The mold 28 may be coupled to the frame 12. The mold 28 may be in axial alignment with the compression rod 22 and the rammer 24 to allow the moving mechanism 26 to move the compression rod 22 and rammer 24 in and out of the mold 28. The mold 28 may be an elongated tubular member having different geometrical configurations. For example, the mold 28 may be a cylindrical tubular member, a rectangular tubular member or other geometrical configurations.

The mold 28 may have a first open end 28A and a second open end 28B. The first open end 28A may be formed on a side opposite of the second open end 28B and are aligned with one another. The first open end 28A allows the compression rod 22 and the rammer 24 to enter the mold 28 while the second open end 28 allows the biomass log 34 to exit the mold 28 once formed. In accordance with the present embodiment, the rammer 24 may have the same perimeter geometrical configuration and perimeter sire as the mold 28. This may allow for the rammer 24 to slide within the mold 28 with minimal clearance. The snug fit of the rammer 24 within the mold 28 may prevent debris from exiting the mold 28 thereby preventing the debris from clogging the moving mechanism 26 and allowing for a tighter compressed biomass log 34.

A loading opening 28C may be formed on a top surface of the mold 28. The loading opening 28C close to the first open end 28A. The loading opening 28C may be used to insert biomass 30 in the mold 28.

A hopper 32 may be coupled to the top surface of the mold 28. The hopper 32 may be a funnel-shaped chamber in which the biomass 30 is loaded through the top open end 32A and stored temporarily, and dispensed through a bottom open end 32B into the mold 28. The hopper 32 may be removably coupled to the mold 28. A plurality of attachment devices 35 may be used to attach and remove the hopper 32 from the mold 28 as required.

In the present embodiment, the attachment devices 35 may be a plurality of clamping devices 36. Each clamping device 36 may each have a base member 38, a latch 40 swingly attached to each base member 38 and a corresponding latch catch 42 that engages with the latch 40. As may be seen in the FIGS., each base member 38 may be coupled to an exterior side surface of the mold 28. In the present embodiment, a pair of base members 38 are posited on opposing exterior side surfaces of the mold 28. A latch 40 may be swingly attached to each base member 38. The corresponding latch catch 42 may be attached to an exterior side surface of the hopper 32, in operation, the latch 40 of each base member 38 may engage a corresponding, latch catch 42 thereby securing the hopper 32 to the top surface of the mold 28.

A gate 44 may be coupled to the frame 12 and/or the mold 28. The gate 44 may be used to cover the second open end 28B of the mold 28 to allow the rammer 24 to compresses the biomass 30 in the mold 28 against the gate 44 to form the biomass log 34. Once the biomass log 34 is formed in the mold 28, the gate 44 may be raised to allow the rammer 24 to eject the biomass log 34 out of the second open end 28B of the mold 28 onto a receiving platform 12C of the frame 12.

In accordance with one embodiment, the gate 44 may have a gate frame 46. The gate frame 46 may be coupled to the frame 12. The gate frame 46 may also be coupled to the mold 28 to provide additional stability. The gate frame 46 may have a channel 48 formed therein. The channel 48 may allow a plate 50 to move vertically (i.e., raised and lowered) within the gate frame 46 while preventing the plate 50 from moving horizontally in the channel 48. This may allow the rammer 24 to compresses the biomass 30 in the mold 28 against the plate 50.

In accordance with one embodiment, the channel 48 may have a width approximately equal to a thickness of the plate 50 thereby preventing the plate 50 from moving horizontally within the channel 48. The gate frame 46 and the plate 50 may be formed from a sturdy material resistant to bending due to weight and pressure/torque applied. In accordance with one embodiment, a metal such as steel, steel alloy or the like may be used.

The device 10 may have a gate lifter 52 to raise and lower the gate 44, in the present embodiment, the gate lifter 52 may be used to raise and lower the plate 50 within the channel 48 of the gate frame 46. The gate lifter 52 may be a motor, a pneumatic device, hydraulic device or the like. In accordance with one embodiment, the gate lifter 52 may be one or more hydraulic cylinders 52A.

The device 10 may have a control panel 54. The control panel 54 may be used to control operation of the device 10. The control panel 54 may have a plurality of control devices 56 for operating the device 10. In the present embodiment, the control devices 56 may be a plurality of levers 56A. The levers 56A may be used to control the operation of the compression mechanism 20 and the gate lifter 52. When the lever 56A associated with the compression mechanism 20 is moved in a forward position, the compression mechanism 20 moves the rammer 24 forward into the mold 28 compressing the biomass 30 in the mold 28. Moving the lever 56A associated with the compression mechanism 20 is moved backward, the compression mechanism 20 moves the rammer 24 back. Controlling the amount of biomass 30 that passes through the hopper 32 is directly related to the position of the rammer 24 as may be seen in FIG. 3. This ability to control the flow of the biomass 30 is what gives the device 10 speed and control not available in all other prior art devices.

In a similar manner, when the lever 56A associated with the gate, lifter 52 is moved in a forward position, the gate lifter 52 raises the plate 50 within the channel 48 of the gate frame 46. Moving the lever 56A associated with the gate lifter 52 is moved backward, the gate lifter 52 lowers the plate 50 within the channel 48 of the gate frame 46. This action may allow the device 10 to have the speed and control not available in prior art devices.

When the lever 56A associated with the gate lifter 52 is moved in a forward position and the gate lifter 52 raises the plate 50 so that second open end 28B of the mold 28 is open and not blocked, the lever 56A associated with the compression mechanism 20 may be moved in a forward position so that the compression mechanism 20 moves the rammer 24 forward into the mold 28 to eject the biomass log 34 out of the second open end 28B of the mold 28. This process allows the device 10 to have increase biomass log 34 making capabilities over the prior art. For example, in some prior art machines, the formation of a biomass log may take up to 8 minutes. However, using the device 10, three or more biomass logs 34 may be made in one minute. Further, the above process also allows one to make varying sizes of biomass log 34 based on how the biomass log is to be used.

In the present embodiment, the moving mechanism 26 of the compression mechanism 20 and the gate lifter 52 are hydraulic systems. Thus, the device 10 may have a reservoir 58. The reservoir 58 may be used for storing hydraulic fluid 58A. A hydraulic pump 60 may be coupled to the reservoir 58. The hydraulic pump 60 moves the hydraulic fluid 58A through the device 10 via tubing 62 to move compression mechanism 20 and the gate lifter 52. A motor 65 may be provided to power the hydraulic pump 60. When the hydraulic fluid 58A is sent to the compression mechanism 20 and/or the gate lifter 52, the compression mechanism 20 and/or the gate lifter 52 converts the hydraulic energy into mechanical energy to move the rammer 24 and/or gate 50. In accordance with one embodiment, the hydraulic system of the device 10 may allow the compression mechanism 20 to exert an extreme amount of pressure. In accordance with one embodiment, the hydraulic system of the device 10 may allow the compression mechanism 20 to exert up to 84,800 pounds of pressure when compressing the biomass 30 in the mold 28.

The device 10 may have a heat jacket 64. The heat jacket 64 may be formed around an outer surface of the mold 28 around an exterior perimeter of the mold 28. The heat jacket 64 may be used to heat the mold 28 when compressing the biomass 30 in the mold 28. The heat brings out natural, binders in the biomass 30 which, along with the compression, keeps the biomass log 34 together longer while burning. Increasing the length, of time that the biomass log 34 stays together increases the burning time and can provide a more uniform temperature of the biomass log 34.

In accordance with one embodiment, the heat jacket 64 may be naturally heated using the heat generated by the hydraulic system, specifically the hydraulic fluid 58A. In general, the heat of the hydraulic fluid 58A is generally allowed to dissipate in the ambient air. However, in the device 10, the hydraulic fluid 58A may be diverted to run through the heat jacket 64 heating the mold 28 when compressing the biomass 30 in the mold 28. The heat from the hydraulic fluid 58 and the compression from the compression mechanism 20 activates natural resins in the biomass 30 allowing the biomass 30 to be bound tighter together generating a biomass log 34 that may burn longer and more efficiently.

The device 10 may have a log splitter 70 and can be converted for auxiliary use as such. In accordance with one embodiment, the log splitter 78 may have a log splitter wedge 71A and log splitter ram plate 71B. The log splitter wedge 71A and log splitter ram plate 71B may be stored on the side of the frame 12 as may be seen in FIG. 2 when not being used. When in use, log splitter wedge 71A may be coupled to the frame 12 in front of the first open end 28A of the mold 28. Bolts and pre-drilled holes may be used to secure the log splitter wedge 71A to the frame 12 in front of the first open end 28A.

Figure 2:
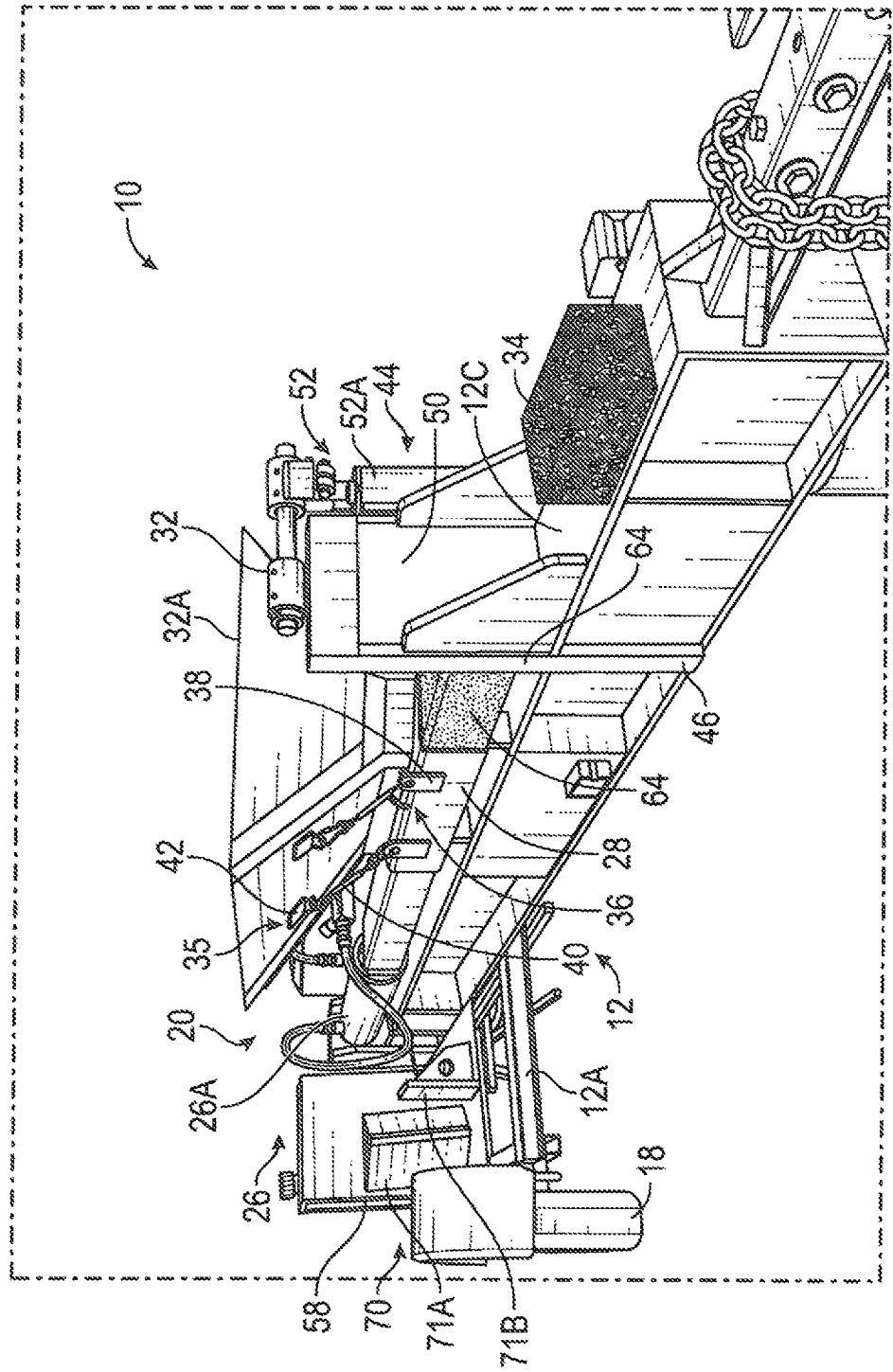
FIG. 2 is a front perspective view showing an exemplary embodiment of the biomass compacting device of FIG. 1 in accordance with one aspect of the present application.
Figure 3:
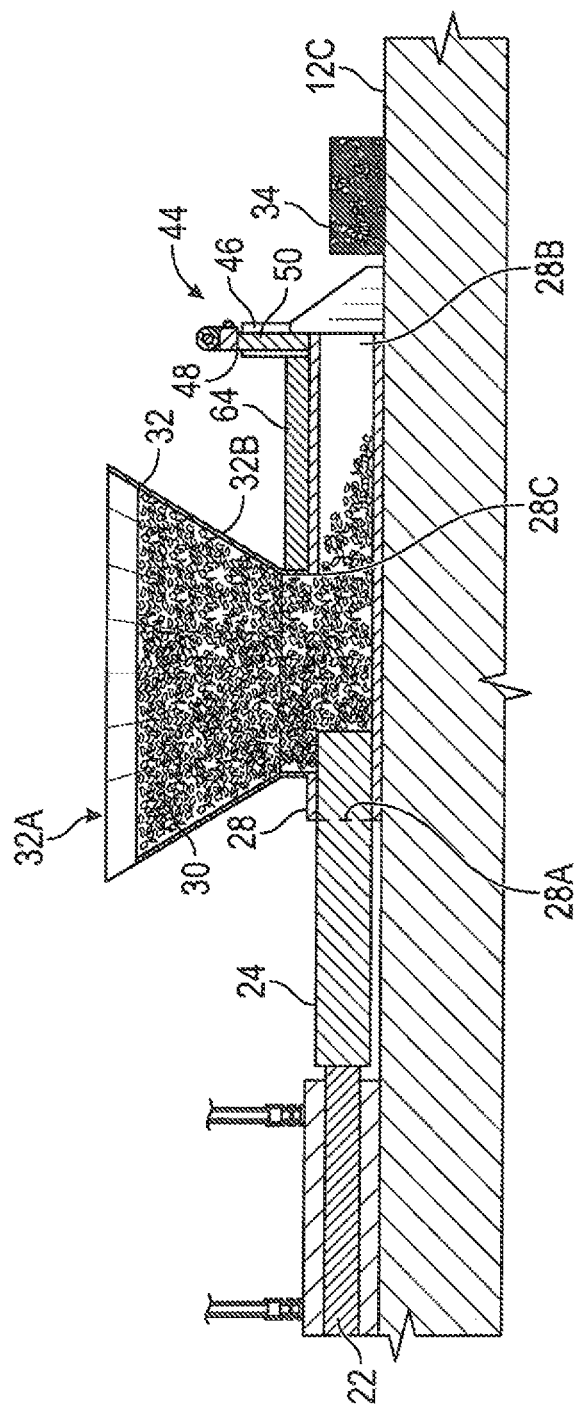
FIG. 3 is a magnified cross-sectional view not to scale showing an exemplary embodiment of the hopper, compression rod, rammer, heat jacket, mold, and gate of the compacting device of FIG. 1 in, accordance with one aspect of the present application.
Figure 4:
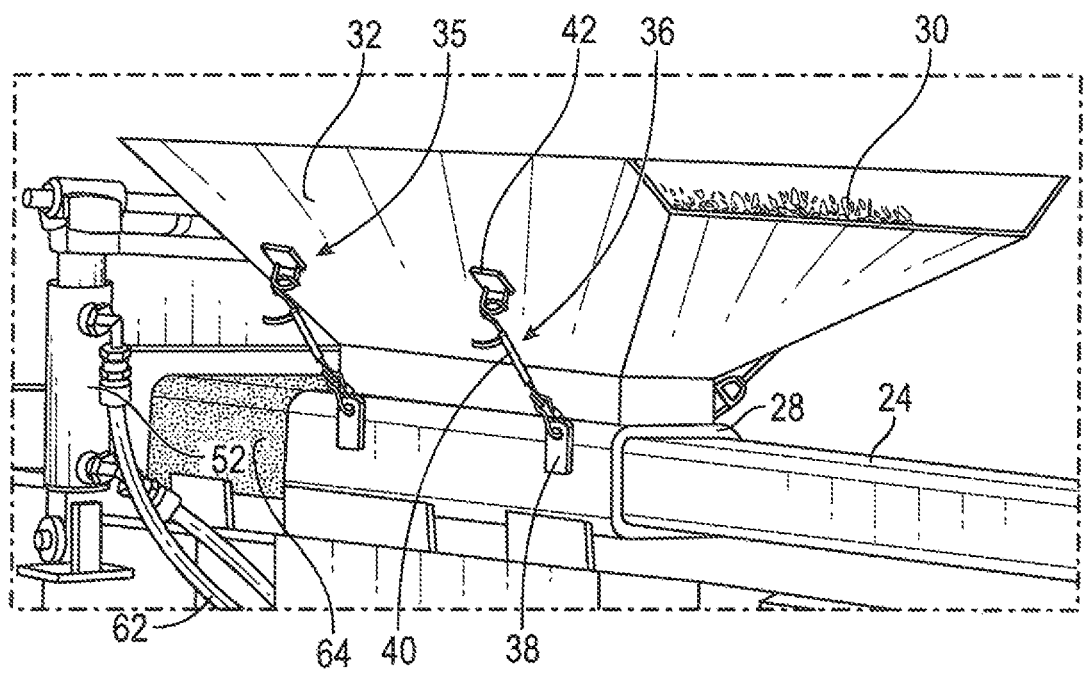
FIG. 4 is a magnified cross-sectional view showing an exemplary embodiment of the hopper, ram rod, of the compacting device of FIG. 1 in accordance with one aspect of the present application.
Figure 5:
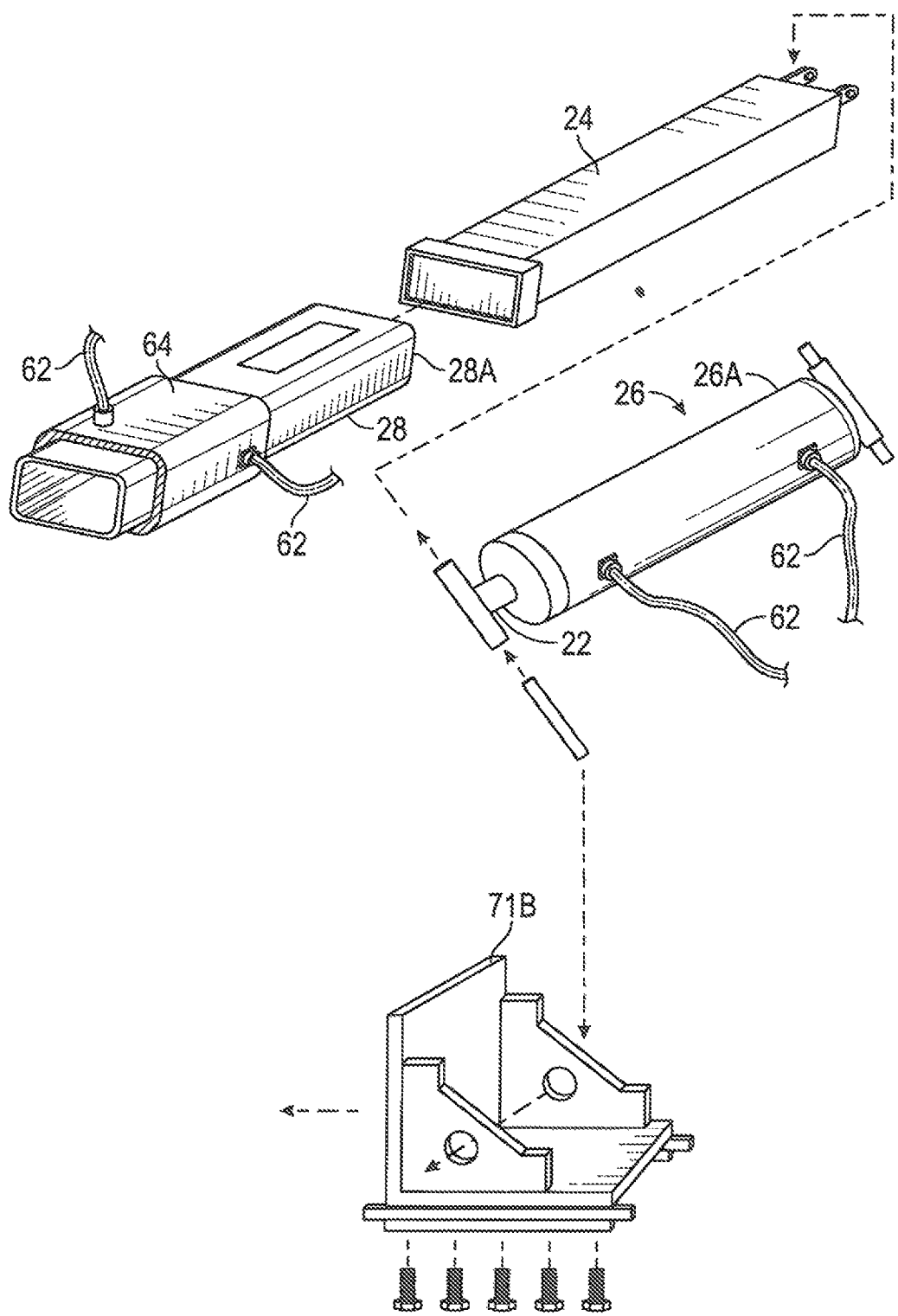
FIG. 5 is an exploded view showing removal of the rammer and attachment of a log splitter, ram plate of a log splitter used in the compacting device of FIG. 1 in accordance with one aspect of the present application.
Figure 6:
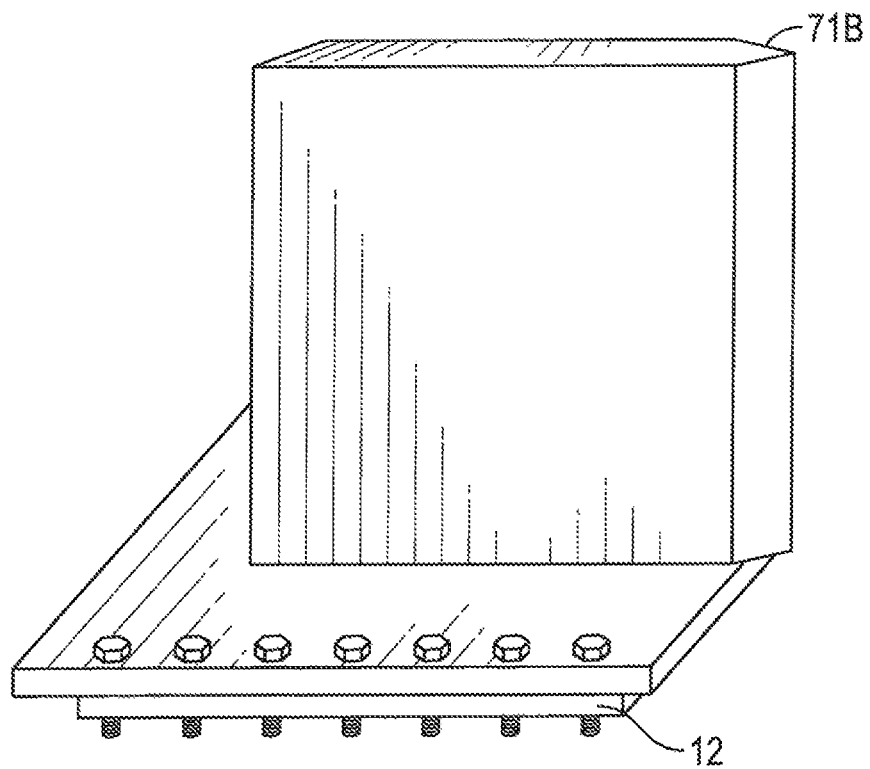
FIG. 6 is a perspective view of a log splitter wedge of the log splitter use in the compacting device of FIG. 1 in accordance with one aspect of the present application.

The log splitter ram plate 71B may be attached to the compression rod 22 by means of a pin set to allow the log splitter ram plate 71B to smoothly slide towards the log splitter wedge 71A attached on the frame 12 in front of the first open end 28A of the mold 28. A cut tree log of 24" in length, and up to 30" in diameter can be placed on the frame 12 at the front of the log splitter ram plate 71B. In operation, the control panel 54 can be used so the compression rod 22 causes the log splitter ram plate 71B to press a log towards the log splitter wedge 71A splitting the log into multiple and manageable pieces. The angle of the log splitter wedge 71A may naturally divert the split portions of the log to fall to the side, away from the mold 28 and gate 44 thereby protecting the device 10 from damage. Upon completion of the log splitting, the log splitter wedge 71A and log splitter ram plate 71B can be removed and stored as shown in FIG. 2. The rammer 24 may then be reattached to the compression rod 22 so biomass log 34 production may resume.

Figure 7:
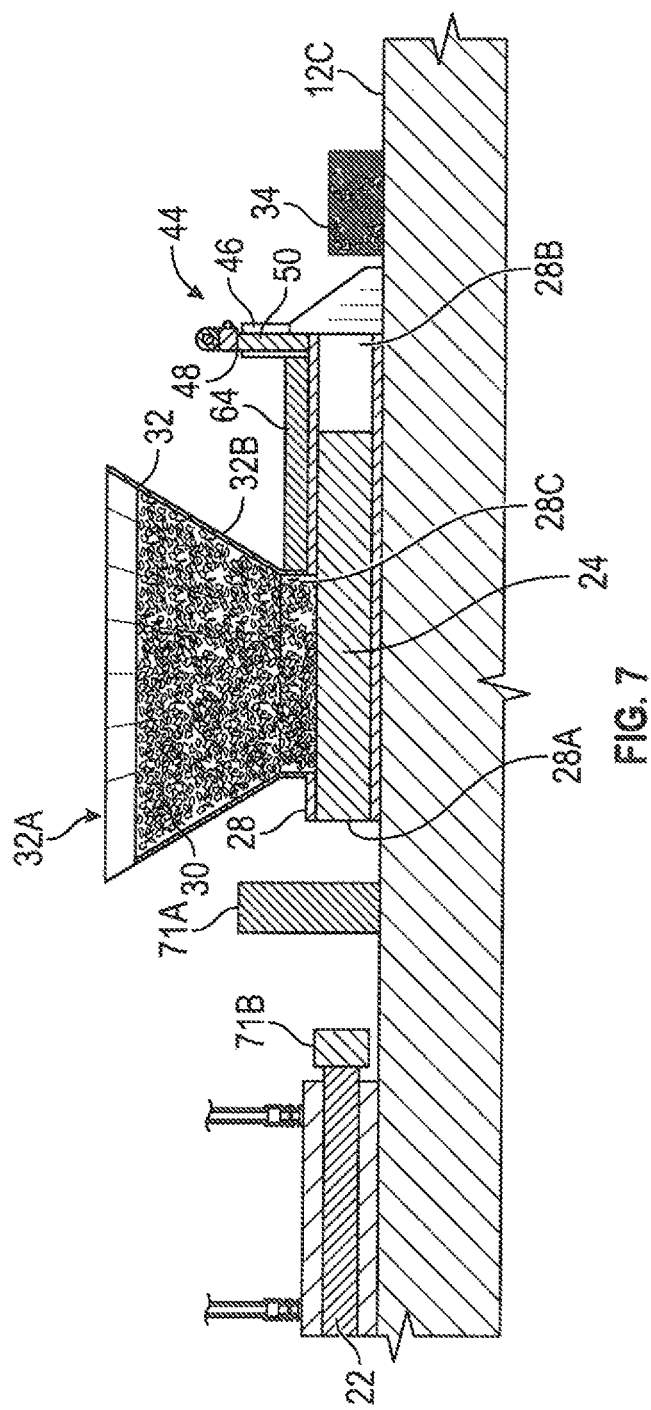
FIG. 7 is a magnified cross-sectional view not to scale showing an exemplary embodiment of the hopper, compression rod, rammer, heat jacket, mold, gate and log splitter of the compacting device of FIG. 1 in accordance with one aspect of the present application.

The installation of the log splitter ram plate 71B may be as follows. The compression rod 22 may be activated moving the rammer 24 into the mold 28. The rammer 24 can be detached from the compression rod 22. The compression rod 22 may then be retracted into the hydraulic unit 26A leaving the rammer 24 in the mold 28. Thus, the mold 28 may be utilized to store the rammer 24 when the rammer 24 is not being used as may be seen in FIG. 7. The log splitter ram plate 71B may then be installed on the compression rod as detailed above.

Figure 8:
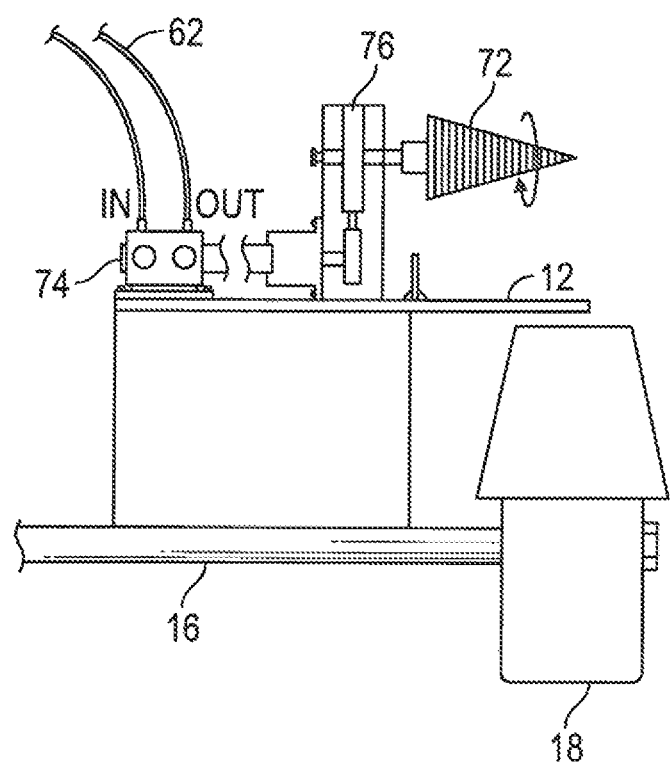
FIG. 8 is a magnified cross-sectional view showing an exemplary embodiment of a cone log splitter of the compacting device of FIG. 1 in accordance with one aspect of the present application.

The log splitter 70 may alternatively, or in addition to have a screw cone 72 as shown in FIG. 8. The screw cone 72 may be coupled to the frame 12. A hydraulic motor 74 may rotate a wheel assembly 76 which may rotate the screw cone 72. The hydraulic motor 74 may be coupled to tubing 62 which may provide the hydraulic fluid to the hydraulic motor 74.

The above log splitters 70 provide the user of device 10 a personal choice when cleaning and/or maintaining a yard, land, farm or forest area while utilizing all of the natural bio-resources at his disposal.

Once the biomass log 34 is formed, the compression mechanism 20 may move the rammer 24 forward to eject the biomass log 34 out of the second open end 28B of the mold 28.

The device 10 allows for the efficient and timely manufacture of biomass logs 34 which may be used for heat and enjoyment.

While embodiments of the disclosure have been described in terms of various specific embodiments, those skilled in the art will recognize that the embodiments of the disclosure may be practiced with modifications within the spirit and scope of the claims.

What is claimed is:

1. A portable biomass compactor, comprising
    a frame;
    a mold coupled to the frame, Therein the mold comprises:
        a tubular member having a first open end and a second open end, the first open end formed on a side opposite of the second open end and aligned with the second open end;
        a loading opening formed on a top surface of the mold, wherein biomass is loaded into the mold through the loading opening;
    a compression mechanism coupled to the frame, wherein the compression mechanism comprises:
        a moving mechanism;
        a rod having a proximate end coupled to the moving mechanism; and
        a rammer coupled to a distal end of the rod;
        wherein the rod and rammer are aligned with the first open end and the second open end, the moving mechanism moving the rod and the rammer within the mold compressing the biomass in the mold;
    a gate movably coupled to the frame, wherein the gate closes the second open end during compressing of the biomass allowing the compression mechanism to compress the biomass against the gate and opens the second open end allowing the compression mechanism to eject a biomass log formed put of the second open end;
    a gate lifter coupled to the gate raising and, lowering the gate to open and close the second open end;
    a heat jacket formed around an exterior perimeter of the mold heating the mold when the biomass is being compressed in the mold.

2. The portable biomass compactor of claim 1, comprising a hydraulic system coupled to the compression mechanism and the heat jacket, the hydraulic system moving the compression mechanism and heating the heat jacket.

3. The portable biomass compactor of claim 1, comprising an axle assembly coupled to the frame.

4. The portable biomass compactor of claim 1, wherein the moving mechanism of the compression mechanism and the gate lifter are a hydraulic system.

5. The portable biomass compactor of claim 1, wherein the moving mechanism of the compression mechanism and the gate lifter are hydraulic system, the hydraulic system coupled to the heat jacket and heating the heat jacket.

6. The portable biomass compactor of claim 1, wherein the gate comprises:
    a gate frame coupled to the frame and proximate the second opening of the tubular member;
    a channel formed in the gate frame; and
    a plate positioned in the channel and coupled tea the gate lifter, the gate lifter raising and lowering the plate within the channel, the channel preventing the plate from moving horizontally within the channel.

7. The portable biomass compactor of claim 1, comprising a control panel coupled to the moving mechanism of the compression mechanism and the gate lifter.

8. The portable biomass compactor of claim 4, wherein the hydraulic system comprises:
    a reservoir storing hydraulic fluid;
    a hydraulic pump coupled to the reservoir; and
    a motor is coupled to the hydraulic pump.

9. The portable biomass compactor of claim 1, comprising a hopper coupled to the loading opening.

10. A portable biomass compactor, comprising:
a frame;
a mold coupled to the frame, wherein mold comprises:
- a tubular member having a first open end and a second open end, the first open end formed on a side opposite of the second open end and aligned with the second open end;
- a loading opening formed on a top surface of the mold, wherein biomass is loaded into the mold through the loading opening;

a compression mechanism coupled to the frame, wherein the compression mechanism comprises:
- a hydraulic moving mechanism;
- a rod having a proximate end coupled to the hydraulic moving mechanism; and
- a rammer coupled to a distal end of the rod;
- wherein the rod and rammer are aligned with the first open end and the second open end, the moving mechanism moving the rod and the rammer within the mold compressing the biomass in the mold;

a gate movably coupled to the frame and proximate the second open end, wherein the gate closes the second open end allowing the compression mechanism to compress the biomass against the gate during compressing of the biomass and opens the second open end allowing the compression mechanism to eject a biomass log formed out of the second open end;
a gate lifter coupled to the gate raising and lowering the gate;
a heat jacket formed around an exterior perimeter of the mold applying heat to the mold.

11. The portable biomass compactor of claim 10, comprising an axle assembly coupled to the frame.

12. The portable biomass compactor of claim 1, comprising:
- a reservoir storing hydraulic fluid;
- a hydraulic pump coupled to the reservoir;
- a motor is coupled to the hydraulic pump; and
- tubing coupling the hydraulic pump to the hydraulic moving mechanism and the hydraulic gate lifter.

13. The portable biomass compactor of claim 12, wherein the tubing is coupled to the heat jacket and heating the heat jacket.

14. The portable biomass compactor of claim 10, wherein the gate comprises:
- a gate frame coupled to the frame and proximate the second open end;
- a channel formed in the gate frame; and
- a plate positioned in the channel and coupled to the hydraulic gate lifter, the gate lifter raising and lowering the plate within the channel, the channel preventing the plate from moving horizontally within the channel.

15. The portable biomass compactor of claim 10, comprising a control panel coupled to the hydraulic moving mechanism and the hydraulic gate lifter.

16. The portable biomes compactor of claim 10, comprising a hopper coupled to the loading opening.

17. A portable biomass compactor, comprising:
a frame;
an axle assembly coupled to the frame;
a mold coupled to the frame, wherein the mold comprises:
- a tubular member having a first open end and a second open end, the first open end formed on a side opposite of the second open end and aligned with the second open end;
- a loading opening formed on a top surface of the mold, wherein biomass is loaded into the mold through the loading opening;

a compression mechanism coupled to the frame, wherein the compression mechanism comprises:
- a hydraulic moving mechanism;
- a rod having a proximate end coupled to the hydraulic moving mechanism; and
- a rammer coupled to a distal end of the rod;
- wherein the rod and rammer are aligned with the first open end and the second open end, the moving mechanism moving the rod and the rammer within the mold compressing the biomass in the mold;

a gate frame coupled to the frame and proximate the second open end;
a channel formed in the gate frame;
a plate positioned in the channel, the plate closes the second open end allowing the compression mechanism to compress the biomass against the plate during compressing of the biomass and, after compression of the biomass, opens the second open end allowing the compression mechanism to eject a biomass log formed out the second open end;
a hydraulic gate lifter raising and lowering the plate within the channel, the channel preventing the plate from moving horizontally within the channel;
a hopper coupled to the loading opening; and
a heat jacket formed around an outer perimeter of the mold applying heat to the mold during compression of the biomass.

18. The portable biomass compactor of claim 17, comprising:
- a reservoir storing hydraulic fluid;
- a hydraulic pump coupled to the reservoir;
- a motor is coupled to the hydraulic pump; and
- tubing coupling the hydraulic pump to the hydraulic moving mechanism and the hydraulic gate lifter.

19. The portable biomass compactor of claim 18, wherein the tubing is coupled to the heat jacket and heating the heat jacket.

20. The portable biomass compactor of claim 17, comprising a control panel coupled to the hydraulic moving mechanism and the hydraulic gate lifter.

21. The portable biomass compactor of claim 17, comprising a log splitter coupled to the frame.

22. The portable biomass compactor of claim 21, wherein the log splitter comprises:
- a log splitter plate; and
- a log splitter wedge.

23. The portable biomass compactor of claim 21, wherein the log splitter comprises a screw cone.

* * * * *